Patented Oct. 3, 1950

2,524,613

UNITED STATES PATENT OFFICE 2,524,613

METHOD OF MANUFACTURING ROUNDED GLASS PARTICLES

Eugene Wainer, Cleveland, Ohio, assignor to Cataphote Corporation, Toledo, Ohio, a corporation of Ohio No Drawing. Application July 9, 1949, Serial No. 103,957

14 Claims. (Cl. 49—84)

1

This invention relates to the production of small glass spheres, beads or rounded particles, and more particularly to an improved process for making glass beads of the type used in reflecting paints, in catalytic cracking processes for petroleum industries, etc.

Small glass beads, spheres or rounded particles of glass have found extensive applications as ingredients of reflecting paints used for highway marking and have been used extensively as coatings for motion picture screens. These small beads range in size from .010" to .070" with a size of about .040" in most demand. Smaller sizes are used in the greeting card industry and larger sizes in the range of .070" to 0.125" are used in petroleum cracking processes.

It is well known that when particles of crushed glass are heated to the proper temperature they draw up into spheres due to their own surface tension. These spheres can be classified in a definite size range by controlling the size of the irregularly shaped crushed glass particles used and by separation of the spheres after production. Methods for producing glass spheres, for the most part, have been based on some way of supporting the glass particles in a blast of gas during their heating. The common large scale production methods utilize the step of dropping the crushed glass into a tower having a gas-air mixture burning near the bottom. The spherical product is either blown back out of the top of the tower by the blast or it is permitted to fall through the hot zone into a cooler collector at the bottom.

Such methods have definite disadvantages. The glass particles have a tendency to adhere to each other and to the walls of the tower while in the molten state. If the temperature is lowered to reduce this tendency, the particles are apt to be insufficiently heated and to come out of the tower as ovals instead of spheres. If the batch is fed more slowly to provide for wide separation of the particles in the tower, the rate of production becomes too slow to be economically feasible. Furthermore, uneven heating of the glass particles frequently occurs, thus causing the cooler particles to be coated with soot and the hotter particles to form air bubbles and thus destroy their transparency. In addition, if the burning mixture is permitted to become reducing, the glass is discolored and the spheres not usable for many purposes.

Many of the disadvantages of this older method of making glass beads have been overcome by the newer method described in the patent to Davis et al., No. 2,460,977, issued on February 8, 1949.

2

In the Davis et al. process, the ground glass particles are mixed with a suitable form of finely divided carbon and then heated to provide glass beads. The beads are then separated from the carbon and cleaned or washed. This method has resulted in the production of more uniformly spherical beads, and is further advantageous in that large amounts of costly and specialized equipment are not required. However, the Davis et al. process provides only a partial answer to the problems involved in making glass beads. For most purposes, it is highly important that the beads be clear and free from corrosion. It is extremely difficult to make clear beads by the carbon mixture process, because the occasional occlusion (or dissolution) of carbon particles in the glass beads discolors them and makes them at least partially opaque. As recognized by Davis et al. in their specification, an inherent source of discoloration and corrosion in the carbon mixture method is the presence of reducing gases which arise from the burning of carbon. Not only is it difficult to produce clear, uncoated glass beads with the carbon mixture method, but such method is inherently disadvantageous because of the tendency of carbon to unite with the oxygen in the air. Because of this characteristic, it is necessary to restrict the access of air to the carbon-ground glass mixture while it is being heated, and further necessitates operating at relatively low temperatures where the combustion of the carbon may be controlled.

It is an object of this invention, therefore, to provide a method for producing uniformly spherical glass beads free from discoloration and corrosion.

Another object of this invention is to provide a method of producing glass beads which is highly economical in that sufficiently high temperatures are employed to materially shorten the fusing step.

Another object of this invention is to provide a method of making glass beads and the like wherein the isolating medium employed is not wetted by the glass, gives off no gases at the temperatures involved, and is not affected by heating in air.

A still further object of this invention is to provide a method for making glass beads wherein the glass beads are isolated during their formation by a material containing boron nitride.

Other objects and advantages of this invention will become apparent from the following detailed description thereof.

In general, the invention comprises isolating glass particles with a material containing boron nitride, heating the glass particles to produce spherical beads, cooling the glass beads, and separating the isolating material from the glass beads.

As above pointed out, when ground glass particles or glass cullet are heated, they have a natural tendency, because of their surface tension, to form beads substantially spherical in shape. It is also well known in the art that the optimum procedure in making glass beads involves heating the glass to the lowest temperature at which the viscosity of the glass is sufficiently reduced to permit the surface tension to draw the particle into a ball or bead. After the bead is formed, it should be cooled immediately to prevent adherence of other beads or foreign particles. The exact temperatures involved will vary according to the particular glass used, and form no part of the present invention inasmuch as they are well known to those skilled in the art. The basic problem in the production of glass beads has always been that of isolating the glass particles during and after the formation of the bead.

Davis et al., in the patent above cited, employed various forms of carbon as an isolating medium to be mixed with the glass cullet. These patentees emphasized the importance of the formation of gas due to the combustion of the carbon and its cushioning effect in isolating one particle of glass from the others. While the gas formation was believed to be highly important in isolating the glass particles, it was recognized by the patentees to be detrimental when used with certain types of glasses. Since carbon monoxide is highly reducing, its presence will effect discoloration and corrosion of many of the more common glasses.

We have found that boron nitride, when used as an isolating agent or medium, either alone or in conjunction with other materials, overcomes all of the disadvantages inherent in the carbon isolating medium. According to a preferred method of carrying out the present invention, a bed of isolating medium is spread upon a pallet or conveyor. The finely divided glass cullet is then sprinkled in a layer approximately one particle thick over this bed, and subjected to intense heat until the glass particles are drawn into spheres by their own surface tension. Immediately upon the formation of the spheres or beads, the pallet is removed from the heating zone and the beads allowed to cool. By tipping the tray or pallet, the beads are rolled from the surface thereof, and may be subsequently washed in a solution containing a suitable detergent.

As another method illustrative of the present invention, the glass cullet is intimately mixed with the isolating agent containing boron nitride. This mixture is then subjected to heat until the glass particles are drawn into beads, after which the mixture is cooled. Subsequently the isolating medium is separated from the beads by some suitable procedure, such as screening, and the beads washed.

Regarding the details of the present invention, the glass cullet may be obtained from a variety of sources, depending somewhat upon its ultimate use. For example, scrap window glass or electric light bulbs or some other source providing clear uncolored glass is required where beads are to be employed for reflecting paints. Scrapped bottle glass may be used where the color of the beads is not important. The method is applicable to all types of glass, such as soft glass, Pyrex glass, leaded glasses, etc. The particle size of the cullet controls the size of the bead that is produced.

In the preferred pallet or conveyor method, the pallet is made of some suitable refractory material, such as magnesite or an alumina refractory made to withstand the temperatures employed. It may be porous or nonporous, although porous refractories are preferred because these provide means for adherence of the layer of isolating medium. This method is described with particular reference to a pallet or skid, but it will be evident that the same procedure is applicable to the use of a conveyor of any desired type. A bed of isolating medium is formed upon the pallet merely by spreading this medium with a spatula and pressing it into the surface of the base refractory to obtain good adherence. There is no particular requirement as to the thickness inasmuch as a continuous surface of the isolating medium is all that is required. In actual practice, however, it has been found that this bed will average approximately 0.01″ in thickness.

In a preferred embodiment of the present invention, boron nitride, and particularly the more finely divided material having a mesh size $-325$, is spread upon the pallet forming a bed. While the boron nitride alone is preferred, the present cost of this material makes it highly advantageous to employ various diluents therewith, such as the refractory oxides of aluminum, zirconium, beryllium, magnesium, and thorium, mixed oxides such as chromite, alumina silicates such as kyanite, mullite and other highly refractory materials. Boron nitride may also be mixed with carbon in its various forms, where the discoloring effect of carbon is not material, or where the amount of carbon is such that there is no discoloring effect. It is preferred to use the finer particle sizes of boron nitride, such as $-325$ mesh. When diluents are added to the boron nitride, it is highly desirable that these two ingredients be of approximately the same particle size. Usually the carbon when mixed with boron nitride will be of considerably smaller size than the boron nitride, but this is not material in this particular mixture.

The particle size of the mixture affects the maximum amounts of diluents which can be added to the boron nitride. For example, when the particle size of the diluents and boron nitride are both $-200$ mesh size, the maximum amount of diluents that may be added is 50% by weight. All percentages in this specification refer to amounts by weights, unless otherwise specifically stated. When the particle size of the diluents and boron nitride is increased to $+200$ mesh size or larger, the maximum amount of diluents that may be added is decreased to 35%. The amount of carbon that may be mixed with the boron nitride may vary widely from small amounts up to 90% or more, in the event that the beads are to be used under conditions such that discoloration and corrosion are not important. However, no more than about 15% carbon should be used when discoloration and corrosion must be avoided.

The glass cullet is dropped onto the pallet to form a layer one particle thick, using any suitable device. One such mechanism that may be used is an electrically vibrated feed trough. The pallet with its bed of isolating medium covered by a one particle thick layer of glass cullet is then placed in a lehr and the glass cullet subjected to intense heat. The heating source may be any suitable type, such as gas, fuel oil, electricity, although it is preferred that the glass cullet be heated indirectly by radiant heat since flames from direct heating tend to blow the cullet from the pallet. High temperatures in the neighborhood of from 2000° to 2300° C. are preferred, because at these temperatures only from 10 to 30 seconds is required to heat the glass particles sufficiently to form beads. For one type of glass, for example, 30 seconds to one minute are required at 1800° F., 20 to 30 seconds at 2000° F., and 10 to 20 seconds at 2300° F.

As soon as the glass particles have been drawn up into beads, the pallet is removed from the lehr and the beads allowed to cool in place. Then the pallet is tipped, the beads roll off, and are subsequently washed. Since very little, if any, of the layer of isolating medium is disturbed during the process, the pallet is ready for immediate reuse. This feature is particularly important when a continuous belt is used in place of a pallet.

In an alternative procedure, the glass cullet is intimately mixed with an isolating medium containing boron nitride. As above described in connection with the pallet method, the boron nitride may be used alone and preferably in a particle size of approximately —325 mesh. Although diluents, such as those indicated above in connection with the preferred procedure, may be employed in limited amounts, only inferior results can be obtained with such mixtures. Carbon in amounts up to 90% may be mixed with the boron nitride, but not more than about 15% should be used where beads are desired that will be free from discoloration or corrosion.

The isolating medium must be intimately mixed with the cullet to isolate as completely as possible each particle of glass. This mixing may be achieved in a cement mixer or in a paddle type trommel. Preferably the mix should be dry because it has been found that water, in addition to absorbing heat otherwise used for melting the glass, corrodes the glass upon evaporation. The percentage of isolating medium necessary, based on the total batch including the glass cullet, grows less as the particular size of the isolating medium decreases. Thus, as low as 15% of pure boron nitride may be used when this material has a mesh size of —325, with correspondingly higher minimum percentages for larger particle sizes. When mixtures of boron nitride with other ingredients are employed (carbon excepted), sufficient amounts of these isolating mixtures should be employed so that the total percentage of boron nitride in the glass cullet-isolating medium mixture is not less than 50%. When carbon is used in conjunction with boron nitride, the maximum percentage of carbon that can be employed without deleteriously affecting the glass beads is about 15%, as has been indicated above.

The mixture of glass particles and isolating medium is then placed in a suitable container, such as a rotary kiln, and subjected to heat until fusion of the glass particles produces beads. The time and temperatures employed are interrelated and will vary with the particular type of glass being heated, the type of heat being used, the use of preheating treatments, etc. As a rough approximation, however, the data given above in connection with the preferred method is also applicable here. Since heating devices, such as rotary kilns, have a "hot end" and a "cold end," the time required must be calculated by estimating the time that the mixture is held at different temperatures.

As soon as the glass beads are formed, the mixture is allowed to cool. While separation is possible at about 1200° F., the inconvenience in handling material at this temperature makes such a procedure inadvisable. Separation of the isolating medium from the glass beads is usually effected by screening, using a screen too small to permit passage therethrough of the glass beads, yet large enough to permit the isolating medium to pass therethrough. Before use, the glass beads should be washed in a solution containing a suitable detergent.

In order to enable those skilled in the art to more easily practice the present invention, the following examples are submitted in which various embodiments of this invention are set forth.

*Example 1*

An isolating medium of boron nitride, —325 mesh was spread upon a pallet of a porous high clay alumina refractory in an even layer approximately 0.01" thick. Glass cullet derived from lamp bulbs and having a particle size ranging from 0.04" to 0.07" was spread upon the bed in a layer approximately one particle thick. The pallet was moved into a lehr where it was heated by means of silicon carbide resistance elements to a temperature of about 2300° F. for about 10 seconds. The pallet was then removed, cooled, and tipped to one side to remove the glass beads therefrom. After washing, the glass beads so produced were clear, uncolored and uniformly spherical.

*Example 2*

The same procedure was followed as above described in Example 1, but a different isolating medium comprising a mixture of 90% —325 mesh boron nitride and 10% of powdered graphite was employed. Here again, the glass beads produced were uniformly spherical, clear and uncolored.

*Example 3*

Again following the procedure set forth in Example 1, a different isolating medium was used which consisted of 75% of —325 mesh boron nitride and 25% of calcined alumina of the same mesh size. Clear, spherical, uncolored beads were obtained. Similar results were achieved when the calcined alumina was replaced with zirconia, beryllia, chromite or magnesia.

*Example 4*

A mixture of —325 mesh boron nitride and glass cullet was prepared consisting of 25% boron nitride and 75% glass cullet. This mixture was heated in an internally fired rotary furnace using gas as a fuel under a schedule such that the temperature at the hot end was between 2000° F. and 2300° F. The movement of the mixture through the furnace was so controlled that the mixture was held at a temperature above 1800° F. for at least 60 seconds and above a temperature of 2000° F. for at least 30 seconds. After discharging the mixture, cooling it and separating the glass beads from the isolating medium by screening, the beads so formed appeared to be uniformly spherical, clear and uncolored.

*Example 5*

The same procedure was followed as described above in Example 4 with the exception that the isolating medium was produced by a mix of 90% of boron nitride with 10% of graphite.

From the above description it will be apparent that there are a number of advantages arising from the use of boron nitride in place of carbon in any of its forms. Since boron nitride does not produce gases of any kind at the temperatures involved, the glass beads resulting from the process of the present invention are not subjected to reducing gases and thus are neither discolored nor corroded. Furthermore, boron nitride being white, its occasional occlusion in the glass beads would not materially detract from their ability to reflect light. Because boron nitride is not affected by oxygen at temperatures involved in the production of glass beads, this material makes possible the use of the pallet method herein described, wherein extremely high temperatures may be employed to produce glass beads along with a concurrent reduction in the time required for the heating step. Any one of a large number of different types of apparatus are suitable for the present process, since boron nitride is not affected by air and need not be protected from it, as is the case with carbon in any of its forms.

The pallet method which has been described herein as the preferred method of the present invention, provides better isolation of the glass particles and, consequently, more perfect beads are formed using this procedure. The high temperatures that may be employed make rapid production possible. In addition, the heat is applied directly to the glass and not to a mixture of glass and other materials and, therefore, less heat is required for the production of a given weight of glass beads. Separation of the isolating medium and the glass beads is effected merely by tipping the pallet, and requires no screening or other handling.

A number of variations will become apparent to those skilled in the art from the above detailed description. For example, automatic endless belt conveyors may be used in place of the pallet, and any one of several known methods for distributing the glass cullet upon the pallet (or conveyor) may be employed.

What I claim is:

1. A method of making glass beads, which comprises isolating small particles of glass with a material containing boron nitride, heating the isolated glass particles until they are drawn up into beads, cooling the glass beads, and separating the glass beads from the material containing boron nitride.

2. A method of making glass beads, which comprises spreading an isolating medium composed predominately of boron nitride upon a flat refractory surface to provide a relatively flat layer thereon, depositing a layer of glass cullet approximately one particle thick upon the surface of the isolating medium, heating the glass cullet to provide glass beads, cooling the glass beads, and removing them from the surface of the isolating medium.

3. A method of making glass beads, which comprises covering a flat refractory surface with a layer of an isolating medium composed predominately of boron nitride and containing minor amounts of inert refractory materials, depositing a layer of finely divided glass cullet approximately one particle thick upon the layer of isolating medium, heating the cullet to produce glass beads, cooling the glass beads, and removing them from the layer of isolating medium.

4. In a method of making glass beads, the steps which include covering a flat refractory surface with a layer of an isolating medium composed predominately of boron nitride of at least −200 mesh size and containing inert refractory materials up to 50% by weight, applying a covering of finely divided glass cullet approximately one particle thick upon the layer of isolating medium, heating the cullet to produce glass beads, immediately cooling the glass beads, and removing them from the layer of isolating medium.

5. In a method of making glass beads, the steps which include covering a flat refractory surface with a layer of an isolating medium composed predominately of boron nitride having a mesh size of +200 and containing inert refractory materials up to 35% by weight, spreading a coating of finely divided glass cullet approximately one particle thick upon the layer of isolating medium, heating the cullet to produce glass beads, immediately cooling the glass beads, and removing them from the layer of isolating medium.

6. A method of making glass beads, which comprises covering a flat porous refractory surface with a layer of an isolating medium consisting essentially of boron nitride, depositing a layer of finely divided glass cullet approximately one particle thick upon the layer of isolating medium, heating the cullet to produce glass beads, cooling the beads, and removing them from the layer of isolating medium.

7. In a method of making glass beads, the steps which comprises covering a flat porous refractory surface with a layer of an isolating medium consisting of finely divided boron nitride, spreading a layer of finely divided glass cullet approximately one particle thick upon the layer of isolating medium, heating the cullet just enough to produce glass beads, immediately cooling the glass beads, and removing them from the layer of isolating medium.

8. A method of making glass beads, which comprises covering a flat porous refractory surface with a layer of an isolating medium consisting of a mixture of boron nitride and some form of carbon, depositing a layer of finely divided glass cullet approximately one particle thick upon the layer of isolating medium, heating the cullet to produce glass beads, immediately cooling the glass beads, and removing them from the layer of isolating medium.

9. In a method of producing glass beads, the steps which include spatulating into a flat porous refractory surface a sufficient amount of an isolating medium consisting essentially of finely divided boron nitride to provide a relatively flat continuous layer of this material over the refractory base, depositing a layer of finely divided glass cullet approximately one particle thick upon the layer of isolating medium, heating the cullet until the glass fuses sufficiently to permit the formation of glass beads, cooling the glass beads immediately, and removing them from the layer of isolating medium.

10. In a method of making glass beads, the steps which include spatulating into a flat porous refractory surface an isolating medium consisting of finely divided boron nitride until a relatively flat continuous layer of the isolating medium had been formed upon the refractory base, spreading a covering of finely divided glass cullet approximately one particle thick upon the layer of isolating medium, heating the cullet to produce glass beads, cooling the glass beads, and removing them from the layer of isolating medium.

11. A method of making glass beads, which comprises spatulating into a flat porous refractory surface an isolating medium composed predominately of boron nitride and containing minor amounts of inert refractory materials, sufficient isolating medium being thus applied to provide a relatively flat continuous layer thereof over the refractory base, coating the layer of isolating medium with a layer of finely divided glass cullet approximately one particle thick, heating the cullet just enough to produce glass beads, cooling the beads so formed, and removing them from the layer of isolating medium.

12. A method of making glass beads, which comprises intimately mixing finely divided glass cullet with an isolating medium comprising boron nitride as the predominant constituent, said isolating medium forming from 20% to 75% of the entire mixture of isolating medium and glass cullet, heating the mixture of glass and isolating medium until the glass particles form beads, cooling this mixture, and separating the isolating medium from the beads.

13. A method of making glass beads, which comprises intimately mixing finely divided glass cullet with an isolating medium consisting essentially of finely divided boron nitride, said isolating medium being present in such amounts that the boron nitride therein comprises at least 50% of the total isolating medium-glass cullet mixture, heating this mixture until the glass particles form beads, and separating the isolating medium from the glass beads, etc.

14. A method of making glass beads, which comprises intimately mixing finely divided glass cullet with an isolating medium consisting essentially of boron nitride and minor amounts of inert diluents, said isolating medium being present in such amounts that the boron nitride therein comprises at least 50% of the total isolating medium-glass cullet mixture, heating the mixture of isolating medium and glass cullet until the glass particles form beads, and separating the isolating medium from the beads.

EUGENE WAINER.

No references cited.